United States Patent [19]

Schimmel et al.

[11] Patent Number: 4,614,766
[45] Date of Patent: Sep. 30, 1986

[54] COMPOSITIONS CONTAINING RESINS HAVING AIR-OXIDIZABLE GROUPS AND EPOXY GROUPS AND EPOXY-REACTIVE SILICON-CONTAINING COMPOUNDS HAVING HYDROLYZABLE GROUPS

[75] Inventors: Karl F. Schimmel, Verona; Paul J. Prucnal, Pittsburgh; Douglas R. Camp, Gibsonia, all of Pa.; John W. Tiedt, Whitefish Bay, Wis.

[73] Assignee: PPG Industries, Inc., Pittsburgh, Pa.

[21] Appl. No.: 780,766

[22] Filed: Sep. 27, 1985

[51] Int. Cl.$^4$ ............................................. C08F 8/00
[52] U.S. Cl. .................................. 525/104; 525/100; 525/105; 525/106; 525/431; 525/446; 525/453; 525/523; 525/480; 525/509; 525/474; 525/476; 525/479
[58] Field of Search ............... 525/100, 104, 106, 105, 525/431, 446, 453, 523, 509, 480, 476, 474, 479

[56] References Cited

U.S. PATENT DOCUMENTS

| | | | |
|---|---|---|---|
| 4,191,713 | 3/1980 | Yonezawa et al. | 525/102 |
| 4,243,767 | 1/1981 | Kaufman et al. | 525/102 |
| 4,399,261 | 8/1983 | Kato et al. | 525/342 |
| 4,429,082 | 1/1984 | Lee et al. | 525/426 |
| 4,482,691 | 11/1984 | Saunders, Jr. et al. | 528/69 |

Primary Examiner—Melvyn I. Marquis
Attorney, Agent, or Firm—Thomas M. Breininger

[57] ABSTRACT

Disclosed is a curable composition containing (1) a resin containing at least one air-oxidizable group and at least one epoxy group, and (2) a compound having in a molecule thereof at least one epoxy-reactive moiety and at least one silicon atom directly bonded to a group Y wherein Y represents a hydrolyzable group.

25 Claims, No Drawings

COMPOSITIONS CONTAINING RESINS HAVING AIR-OXIDIZABLE GROUPS AND EPOXY GROUPS AND EPOXY-REACTIVE SILICON-CONTAINING COMPOUNDS HAVING HYDROLYZABLE GROUPS

BACKGROUND OF THE INVENTION

The present invention is directed to curable compositions, especially coating compositions, based on ungelled resins containing both air-oxidizable groups and epoxy groups and based on compounds having both epoxy-reactive moieties and silicon atoms bonded to hydrolyzable groups.

It is known to cure polyepoxides with, for example, amines such as polyamines to produce cured compositions. However, the cure of resins containing air-oxidizable groups via such air-oxidizable groups typically is inhibited by the presence of amines. Moreover, resins which cure essentially solely through an air oxidative cure mechanism, while often providing films ultimately having a good combination of properties, often cure at disadvantageously slow rates which make handling of objects coated with such resins difficult, especially where high temperatures are not utilized to help cure the resins. An object of the present invention is to provide curable compositions which advantageously utilize both an oxidative cure mechanism as well as an epoxy-reactive moiety/epoxy cure mechanism and which can be cured at relatively low temperatures, preferably ambient temperature, to provide cured films having an excellent combination of properties both shortly after curing has begun (sometimes called "early properties") and after curing has been substantially completed (sometimes called "ultimate properties"). In other words an object of the present invention is to provide compositions which can be cured relatively quickly to provide films having a good combination of "early properties", which allow for handling of objects containing the films without causing disadvantageous deterioration of the films, and which ultimately cure to films having an excellent combination of overall "ultimate" properties. Additional objects of the present invention will become apparent to the reader infra.

SUMMARY OF THE INVENTION

The present invention is directed to a curable composition comprising as component (1) a resin containing at least one air-oxidizable group and at least one epoxy group, and as component (2) a compound having in a molecule thereof at least one epoxy-reactive moiety and at least one silicon atom directly bonded to a group Y wherein Y represents a hydrolyzable group. In a preferred embodiment of the invention, component (2) is an amine having in a molecule thereof at least one silicon atom directly bonded to a group Y wherein Y represents a hydrolyzable group.

The present invention is also directed to a two-pack composition containing: (1) a first pack containing a resin containing at least one air-oxidizable group and at least one epoxy group; and (2) a second pack comprising a compound having in a molecule thereof at least one epoxy-reactive moiety and at least one silicon atom directly bonded to a group Y wherein Y represents a hydrolyzable group. It is preferred that the compound of said second pack is an amine.

DETAILED DESCRIPTION OF THE PREFERRED EMBODIMENTS

A curable composition of the invention contains a resin, preferably an ungelled resin, containing at least one air-oxidizable group and at least one epoxy group. As used herein, the term "ungelled" as applied to a resin is understood to mean that the resin is itself liquid at 25 degrees C. or is capable of being liquefied in the presence of a suitable solvent at 25 degrees C. The aforesaid resin may be any resin containing air-oxidizable groups and epoxy groups (1,2-epoxy groups). The resin may be a vinyl addition resin, a polyester resin, an amide-containing resin, a urethane resin, a polyepoxide resin, an aminoplast resin, a phenoplast resin, a polybutadiene resin, or a combination thereof. Air oxidizable groups may be introduced into such resins employing known techniques by utilization of, for example, fatty acids, fatty alcohols, allyl alcohol and drying and semi-drying oils. Epoxy groups may be introduced into such resins employing known techniques such as, for example, utilization of epoxy-functional monomers, epoxidizing drying and semi-drying oils and epoxidizing polybutadiene polymers and copolymers.

In a preferred embodiment of the invention, the ungelled resin containing at least one air-oxidizable group and at least one epoxy group comprises a vinyl addition resin. A particularly preferred vinyl addition resin is an air-drying (i.e., utilizes oxidative cure) vinyl polymerized resin, such as an acrylic resin modified utilizing, for example, a fatty acid, a drying oil, a semi-drying oil or a combination thereof. For example, such an acrylic resin containing air-oxidizable groups can be prepared by first copolymerizing an ethylenically unsaturated monomer containing an epoxy group with one or more other monomers. Representative examples of monomers containing an epoxy group include glycidyl acrylate and glycidyl methacrylate. Representative examples of the other copolymerizable monomers include vinyl monomers such as vinyl acetate, isopropenyl acetate, vinyl chloride and dimethyl maleate; vinyl aromatic monomers such as styrene, alpha-methylstyrene and vinyl toluene; acrylic monomers such as acrylic and methacrylic acids and their ester derivatives such as methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate and isobornyl (meth)acrylate; amides and alkoxyalkylamides of acrylic and methacrylic acids such as acrylamide, methacrylamide, and N-butoxymethacrylamide; and the like. For convenience, the term "(meth)acrylate" has been used herein to denote either or both of the respective acrylate compound and the respective methacrylate compound.

The copolymerization is conducted under free radical vinyl addition polymerization conditions which are known in the art. The quantity and choice of monomer used for the copolymerization can vary widely depending, for example, on the intended use of the resultant resin. Typically, however, the amount of copolymerizable monomer containing an epoxy group ranges from about 15 to about 99, percent by weight based on the total weight of all monomers employed in the copolymerization.

After the copolymerization, the resultant vinyl addition copolymer containing epoxy groups can be reacted with an appropriate compound containing at least one air-oxidizable group such as an air-drying fatty acid, a drying oil, a semi-drying oil or a combination thereof. For example, in just one representative embodiment, the vinyl addition copolymer containing epoxy groups can be reacted with an air-drying fatty acid through the carboxyl groups of the acid to form the ester. Representative examples of air-drying fatty acids which can be utilized for this representative embodiment include those obtained from dehydrated castor oil, linseed oil, soya oil, tung oil, tall oil and the like. Typically, the copolymer containing epoxy groups and the fatty acid in this embodiment are reacted in amounts to provide a ratio of moles of epoxy groups to moles of carboxyl groups respectively of from 1.0:095 to 1.0:0.10, preferably of from 1.0:0.85 to 1.0:0.30. The reaction of the copolymer containing epoxy groups with an air-drying fatty acid can be carried out at temperatures generally ranging from about 60 to about 200 degrees Celsius (degrees C.), preferably in the range of about 100 to about 200 degrees C., in organic solvent such as methyl amyl ketone, xylene, butyl acetate and toluene.

The procedure described above for preparing a vinyl addition resin containing at least one air-oxidizable group and at least one epoxy group is illustrative of just one, particularly preferred way of making such preferred resin. The preferred air-drying resins suitable for preferred compositions of the invention can be prepared by alternative procedures. For example, an ethylenically unsaturated monomer containing an epoxy group can be "pre-reacted" via the epoxy group with an air-drying fatty acid to produce a compound which is copolymerizable with other vinyl compounds such as the vinyl monomers and acrylic monomers described above. Moreover, examples of suitable air-drying vinyl polymerized resins include acrylic resins which have been further modified by reaction with an organic isocyanate such as phenyl isocyanate, cyclohexyl isocyanate, t-butyl isocyanate and n-butyl isocyanate which resins are described, for example, U.S. Pat. No. 4,482,691 the disclosure of which is hereby incorporated by reference.

Given the disclosure herein and procedures generally known in the art, it will be appreciated that various techniques can be utilized to prepare resins containing both oxidative curing groups and epoxy groups. Accordingly, the scope of the present invention is considered to include curable compositions prepared utilizing any suitable resin containing at least one air-oxidizable group and at least one epoxy group in combination with a compound (or a mixture of compounds) having in a molecule thereof at least one epoxy-reactive moiety as well as a silicon atom which silicon atom is directly bonded to a group Y wherein Y represents a hydrolyzable group.

Examples of groups which can represent the hydrolyzable group Y bonded directly to Si include —OR$^1$, $$-O-\overset{O}{\underset{\|}{C}}-R^2, \quad -N-\overset{H}{\underset{|}{C}}-\overset{O}{\underset{\|}{R^2}}, \quad -O-N=\overset{R^3}{\underset{|}{C}}-R^4,$$

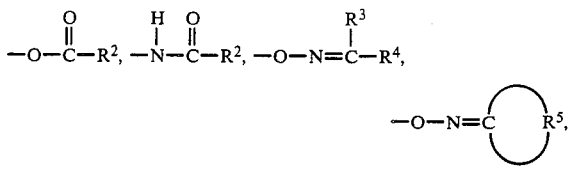

and the monohydroxy and/or cyclic $C_2$–$C_3$ residue of a 1,2- or 1,3-glycol, wherein
- $R^1$ represents $C_1$–$C_3$ alkyl, preferably $C_1$–$C_2$ alkyl, and more preferably methyl,
- $R^2$ independently represents H or $C_1$–$C_4$ alkyl,
- $R^3$ and $R^4$ independently represent H, $C_1$–$C_4$ alkyl, $C_6$–$C_8$ aryl, and
- $R^5$ represents $C_4$–$C_7$ alkylene. Methoxy, ethoxy and acetoxy are particularly preferred hydrolyzable groups, Y.

A wide variety of compounds containing at least one epoxy-reactive moiety and also at least one silicon atom directly bonded to a hydrolyzable group may be employed (as component 2) for a curable composition of the invention. The disclosure in the following sections (a) through (d) regarding compounds containing at least one epoxy-reactive moiety and also at least one silicon atom directly bonded to a hydrolyzable group should be considered to be merely illustrative of such compounds which may be employed. It is preferred to utilize an amine as the compound containing at least one epoxy-reactive moiety and at least one silicon atom directly bonded to a hydrolyzable group. Where it is desired to cure a composition of the invention at ambient temperature under ambient atmospheric conditions in a short period of time, it is preferred that the aforesaid amine contain at least one amino hydrogen atom.

(a) Illustrative compounds (for component 2) for a composition of the invention include such simple compounds as gamma-mercaptopropyltrimethoxysilane, gamma-mercaptopropyltriethoxysilane, gamma-ureidopropyltrimethoxysilane, gamma-ureidopropyltriethoxysilane, gamma-aminopropyltrimethoxysilane, gamma-aminopropyltriethoxysilane, N-beta(aminoethyl)gamma-aminopropyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylethyldiethoxysilane and $(CH_3O)_3Si-(CH_2)_3-NH-(CH_2)_2-NH-(CH_2)_3-Si(OCH_3)_3$.

(b) Illustrative compounds (for component 2) for a composition of the invention include reaction products of an amino-functional silicon-containing compound and an amine reactive (meth)acrylyl-containing compound. Examples of suitable amino-functional silicon-containing compounds include gamma-aminopropyltrimethoxysilane, gamma-aminopropyltriethoxysilane, N-beta(aminoethyl)gamma-aminopropyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane and delta-aminobutylethyldiethoxysilane. Examples of suitable amine reactive (meth)acrylyl-containing compounds include hydrocarbonpolyol poly(meth)acrylates, saturated polyesterpolyol poly(meth)acrylates, alkydpolyol poly(meth)acrylates, urethanepolyol poly(meth)acrylates, polyurethanepolyol poly(meth)acrylates, polyamidepolyol poly(meth)acrylates, etherpolyol poly(meth)acrylates, polyetherpolyol poly(meth)acrylates, and mixtures thereof. Typically, the aforesaid amino-functional silicon-containing compound and amine reactive (meth)acrylyl-containing compound are readily reacted simply by blending them at room temperature or at a slightly elevated temperature, for example, up to about 100 degrees Celsius. The reaction of an amine group with a (meth)acrylyl group is often referred to as a Michael addition. Additional illustrative description of reaction products of amino-functional silicon-containing compounds and amine reactive (meth)acrylyl-containing compounds (such as the poly(meth)acrylates described above) can be found, for example, in U.S. Pat. No. 4,429,082 which is hereby incorporated by reference. For convenience, the terms "(meth)acrylyl" and "poly(meth)acrylates" have been used herein to denote either or both of the respective acrylyl and methacrylyl groups and either or both of the respective polyacrylates and polymethacrylates.

(c) Illustrative compounds (for component 2) for a composition of the invention include reaction products of an amino-functional silicon-containing compound and a compound containing at least one epoxy group. Examples of suitable amino-functional silicon-containing compounds can be found in part (b) above. Examples of suitable compounds containing at least one epoxy group include the generally known polyglycidyl esters of polyphenols and the hydrogenated derivatives thereof such as, for example, the diglycidylether of bisphenol-A, the diglycidylether of hydrogenated bisphenol-A, EPON 828 and EPON 1001 (from Shell Chemical Company); butylene oxide; gamma-glycidoxypropyltrimethoxysilane and beta-(3,4-epoxycyclohexyl)ethyltrimethoxysilane; the polyglycidyl ethers of mononuclear polyhydric phenols such as the polyglycidyl ethers of resorcinol, pyrogallol, hydroquinone and pyrocatechol; as well as the polyglycidyl ethers of polyhydric alcohols such as the reaction products of epichlorohydrin or dichlorohydrin with aliphatic and cycloaliphatic alochols such as ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane. Many additional examples of epoxy resins are described in the *Handbook of Epoxy Resins*, Henry Lee and Kris Neville, 1967, McGraw Hill Book Company.

(d) Illustrative compounds (for component 2) for a composition of the invention include reaction products of: an amino-functional silicon-containing compound; a compound containing at least one epoxy group; and an organosilicon-containing material comprising a compound, corresponding to the formula R—Si(OR$^6$)$_3$ wherein R independently represents OR$^6$, hydrogen, a C$_1$–C$_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, a —Si(OR$^6$)$_3$ group and/or a halo group, or a OR$^7$ group in which R$^7$ represents alkyl having at least 4 carbon atoms, aryl, alkylaryl, arylalkyl, aryloxyalkyl, or alkyloxyalkyl, and wherein R$^6$ independently represents a C$_1$–C$_3$ alkyl group. In the aforesaid definition of R, it is to be understood that the C$_1$–C$_{10}$ group joined to Si through an Si—C linkage can be saturated or can contain aromatic and/or ethylenic unsaturation. Examples of suitable amino-functional silicon-containing compounds can be found in part (b) above, and examples of suitable compounds containing at least one epoxy group can be found in part (c) above.

Examples of suitable organosilicon-containing materials include but are not limited to the following (i) through (iv).

(i) Suitable organosilicon-containing materials include organosilicates, including partial hydrolysis products thereof, such as organosilicates corresponding to the following formula (I),

wherein
R$^6$ represents methyl, ethyl or propyl (thus OR$^6$ is a "lower alkoxy" moiety),
R$^7$ represents alkyl containing at least 4 carbon atoms, aryl, alkylaryl, arylalkyl, aryloxyalkyl, or alkyloxyalkyl, and x is an integer ranging from 0 to 2, preferably 0 or 1, and most preferably 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

Examples of organosilicates, other than the above organosilicates, which may be utilized in the invention include tetraacetoxysilane, diethoxydiacetoxysilane, and

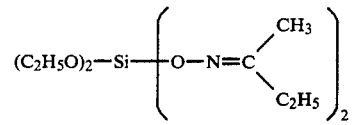

As stated previously the partial hydrolysis products of the organosilicates can be used as organosilicon-containing material. Hydrolyzed organosilicates provide increased reactive groups per molecule. Additionally, the hydrolyzed organosilicates can help provide low volatility to the compositions of the invention.

In preparing a partial hydrolysis product, for example, from an organosilicate of formula (I) above, a controlled amount of water typically is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where desired from organosilicates, can be found in formula (IV) infra. The partial hydrolysis product typically will contain greater than 5.0, and usually greater than 8.0, milliequivalents of residual easily hydrolyzable groups per gram of the partial hydrolysis product.

Where desired, organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties may be employed for preparation of the compositions of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like.

(ii) Suitable organosilicon-containing materials include nonfunctional organosilanes, including partial hydrolysis products thereof. As used herein, a nonfunctional organosilane is understood to mean a material corresponding to the formula, (II),

wherein
$R^8$ represents hydrogen, alkyl, vinyl, aryl, aryl, alkylaryl, arylalkyl, or aryloxyalkyl;
X represents $—OR^1$,

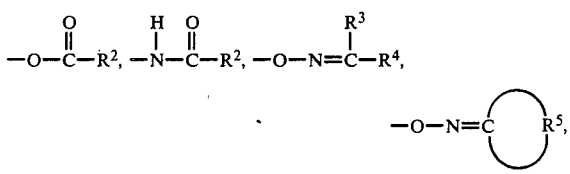

and the monohydroxy and/or cyclic $C_2$-$C_3$ residue of a 1,2- or 1,3-glycol,
wherein
$R^1$ represents $C_1$-$C_3$ alkyl, preferably $C_1$-$C_2$ alkyl, and most preferably methyl,
$R^2$ independently represents H or $C_1$-$C_4$ alkyl,
$R^3$ and $R^4$ independently represent H, $C_1$-$C_4$ alkyl, $C_6$-$C_8$ aryl, and
$R^5$ represents $C_4$-$C_7$ alkylene, and
m is an integer ranging from 1 to 2, preferably 1.

It should be understood that the term "nonfunctional organosilane" wherever appearing herein is used for convenience to distinguish compounds corresponding to the above formula, (II) (and/or partial hydrolysis products thereof) from those compounds (and/or partial hydrolysis products thereof) referred to herein for convenience as functional organosilanes and corresponding to the formula (III) infra. Thus, although moieties defined by X in formula (II) are easily displaceable by reaction with water and/or alcohol and are therefore necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water typically is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (IV) infra. The partial hydrolysis product typically wil contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (II) in which X corresponds to $—OR^1$ as defined above is employed.

Examples of nonfunctional organosilanes corresponding to the above formula, (II), include methyl trimethoxy silane (e.g., available from Union Carbide, Corp. as A-163), dimethyldimethoxysilane, methyltriethoxysilane, dimethyldiethoxysilane, dimethoxydiphenylsilane, dimethoxymethylphenylsilane, diethoxydipropylsilane, dimethoxydipropylsilane, and the like. Additional examples of the nonfunctional organosilanes include amyltriethoxysilane and triethoxysilane. Compounds such as trimethylmethoxysilane, trimethylethoxysilane, and ethoxytripropylsilane may be employed where desired in limited, controlled amounts for modification purposes.

The nonfunctional organosilanes (and/or partial hydrolysis products thereof) are believed to contribute to water resistance, toughness, and stain resistance of cured films prepared from compositions of the invention incorporating these nonfunctional organosilanes (and/or partial hydrolysis products thereof).

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for example, by reacting a nonfunctional organosilane such as methyltrimethoxysilane (and/or a partial hydrolysis product thereof) with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxydimethoxymethylsilane, isopentoxydimethoxymethylsilane, 2-ethylhexoxydimethoxymethylsilane, 2-butoxyethoxydimethoxymethylsilane, diisodecyloxymethoxymethylsilane, phenoxydimethoxyphenylsilane, tolyloxydimethoxymethylsilane, phenylethyloxydimethoxymethylsilane, and the like. However, when a composition of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the composition should contain a residual amount of the easily hydrolyzable moieties (Y) from the organosilicon-containing material. Moreover, the presence of such $OR^7$ type groups in a composition of the invention, may contribute to a slower rate of cure.

(iii) Suitable organosilicon-containing materials include functional organosilanes, including partial hydrolysis products thereof. As used herein, a "functional organosilane" is intended to include materials corresponding to the following formula, (III),

wherein
G represents an organo group containing from 2 to 10 carbon atoms,
X represent $—OR^1$,

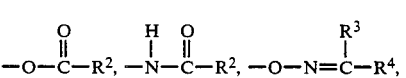

-continued

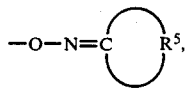

and the monohydroxy and/or cyclic $C_2$–$C_3$ residue of a 1,2- or 1,3-glycol,
wherein
$R^1$ represents $C_1$–$C_3$ alkyl, preferably $C_1$–$C_2$ alkyl, and most preferably methyl,
$R^2$ independently represents H or $C_1$–$C_4$ alkyl,
$R^3$ and $R^4$ independently represent H, $C_1$–$C_4$ alkyl, $C_6$–$C_8$ aryl, and
$R^5$ represents $C_4$–$C_7$ alkylene, and
F represents amino, polyamino, 1,2-epoxy, mercapto, cyano, allyl, vinyl, urethano, halo, isocyanato, ureido, imidazolinyl, acrylato, methacrylato, or a group corresponding to —$SiX_3$, wherein X is as defined above.

In accordance with the discussion of the distinction between nonfunctional organosilanes and functional organosilanes as these terms are used herein, groups defined by F above are considered to be the "functional" groups encompassed by the term "functional organosilane." Some examples of functional organosilanes include gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatopropyltriethoxysilane, vinyl trimethoxy silane, vinyl triethoxy silane, mercaptopropyltrimethoxysilane, mercaptoethyltrimethoxysilane, mercaptopropyltriethoxysilane, glycidoxypropyltrimethoxysilane, glycidoxypropyltriethoxysilane, 4,5-epoxycyclohexylethyltrimethoxysilane, ureidopropyltrimethoxysilane, ureidopropyltriethoxysilane, chloropropyltrimethoxysilane, chloropropyltriethoxysilane,

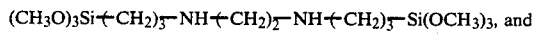

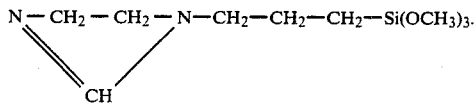

(iv) It is to be understood that mixtures and/or partially hydrolyzed mixtures of (i) the organosilicates (and/or partial hydrolysis products thereof), and/or (ii) the nonfunctional organosilanes (and/or partial hydrolysis products thereof), and/or (iii) the functional organosilanes (and/or partial hydrolysis products thereof) may be employed as the organosilicon-containing material.

In preparing a partial hydrolysis product, for example, from a nonfunctional organosilane of formula (II) above, a controlled amount of water is utilized. Generally, the partial hydrolysis product will contain condensation product compounds having one or more siloxane linkages represented by the formula (V),

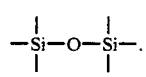 (V)

The hydrolysis and condensation reactions believed to be involved in the preparation of the partial hydrolysis products typically may be illustrated as follows:

[hydrolysis]

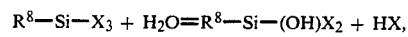

and

[condensation]

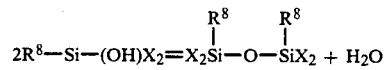

wherein $R^8$ and X are as defined in formula (II) above, X being an easily hydrolyzable group such as, for example, methoxy or ethoxy.

In one method for preparing component (2) of a composition of the invention, a partial hydrolysis product of an organosilicon-containing material containing a nonfunctional organosilane corresponding to formula (II) above, such as methyl trimethoxy silane, optionally in combination with an organosilicate corresponding to formula (I) above and/or a functional organosilane corresponding to formula (III) above is employed. The amount of water typically used for preparing a partially hydrolyzed organosilicon-containing material utilized for this method can be determined according to the following formula (IV), $$(E_{1,2} \times 0.5) + (E_{3,4} \times Z) = W,$$

wherein
W represents the total moles of $H_2O$ employed calculated on the total equivalents of the easily hydrolyzable groups from organosilane compounds such as organosilicates, nonfunctional organosilanes, and functional organosilanes,
$E_{1,2}$ represents the total number of equivalents of easily hydrolyzable groups from organosilane compounds containing one or two easily hydrolyzable groups,
$E_{3,4}$ represents the total number of equivalents of easily hydrolyzable groups from organosilane compounds containing three or four easily hydrolyzable groups, and
Z is a number in the range of from 0.023 to 0.43, preferably in the range of from 0.050 to 0.33, and more preferably in the range of from 0.080 to 0.23.

It is to be understood that one equivalent of the hydrolyzable groups corresponds to one mole of the hydrolyzable groups, and one equivalent of water corresponds to ½ mole of water.

For example, just one useful mixture of organosilanes, suitable as organosilicon-containing material for preparation of a partial hydrolysis product, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (IV) above, $E_{1,2}$ would equal 0.234 and $E_{3,4}$ would equal 4.05; and assuming the maximum moles of water for preparation of the partial hydrolysis product according to formula (IV) (i.e., Z=0.43), the total moles of water for preparation of the partial hydrolysis product would equal 1.86 moles. Or, in other words, a maximum of 1.27 moles of water per mole of organosilane compound (i.e., 1.86 moles/1.468 moles equals 1.27).

Of course, it will be understood that the relative amounts of constituents in a partial hydrolysis product can be adjusted, for example by distilling off a portion, as desired, of volatile constituents from the partial hydrolysis product.

It will be appreciated from the disclosure herein, that the partial hydrolysis product prepared utilizing such a controlled amount of water as determined by formula (IV) above, will contain a mixture of low molecular weight compounds which contain residual easily hydrolyzable groups. The partial hydrolysis product typically will contain greater than 5.0, and usually greater than 8.0, milliequivalents of residual easily hydrolyzable groups per gram of partial hydrolysis product. There is also the possibility that the ungelled partial hydrolysis products prepared utilizing a controlled amount of water as determined from formula (IV) above, also contain a small amount of silanol-type ($\equiv$Si—OH) hydroxyl goups. However, such partial hydrolysis products generally will contain a ratio of residual easily hydrolyzable groups to silanol-type hydroxyl groups greater than 1.00, and typically greater than 3.00.

The partial hydrolysis of the organosilicon-containing material typically is conducted in the presence of from 0.01 to 20 percent by weight of a catalyst such as gamma-aminopropyl triethoxy silane, isophorone diamine, 2-amino-2-methyl-1-propanol, or the like. The percent by weight of catalyst is based on the total weight of the organosilicon-containing material. Preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" of the partial hydrolysis product typically is in a range of from 40 to 300, usually in a range of from 50 to 200.

Compositions of the invention typically are utilized in a two-pack form with one pack comprising the resin containing at least one air-oxidizable group and at least one epoxy group and the other pack comprising the compound (or compounds) having in a molecule thereof at least one epoxy-reactive moiety and at least one silicon atom directly bonded to a group Y wherein Y represents a hydrolyzable group. The two packs are simply mixed together at the time of utilization. It has been found that preferred two-pack compositions of the invention advantageously have a pot life at ambient temperature after mixing which is longer than for generally known two-pack polyurethane coating compositions. For example, preferred coating compositions of the invention have a pot life at ambient temperature of up to about 3 days at the end of which period the compositions can still be spray applied and cured to form cured compositions having an excellent combination of properties.

To enhance potlife of compositions of the invention, where desired, composition compatible materials such as $C_1$-$C_4$ alcohols and materials which easily hydrolyze so as to act as scavengers for water may be combined with the composition, particularly with component (2) of the composition. When the compositions are utilized in two-pack form, the aforesaid materials where desired, typically would be incorporated in the pack containing component (2). Examples of such easily hydrolyzable composition compatible materials include organosilicates, organosilanes, or materials such as ethylorthoformate and 2,2-dimethoxy propane.

The compositions of the invention advantageously may be utilized, as essentially a sole film former for coating various substrates such as plastics, metal, paper, wood, hardboard, glass, and the like. It has been found that compositions of the invention can provide coatings which exhibit an outstanding combination of both "early properties" and "ultimate properties". Moreover, it has been found that compositions of the invention can be cured at low temperatures (less than 180 degrees F., 82.2 degrees C.). Preferred compositions of the invention can be cured at ambient temperature (e.g., 25 degrees C.) under ambient atmospheric conditions. For example, compositions of the invention can be spray applied to form coatings on plastic substrates which can be cured at about 54 to about 66 degrees Celsius in from about 10 to about 60 minutes (usually within 20 minutes) to films which exhibit good "block resistance" and which ultimately cure to films having, for example, good solvent resistance, and a high degree of hardness without being brittle.

Catalysts may be utilized to promote the cure of compositions of the invention. Examples of catalysts which may be used, where desired, include: salts such as tin naphthenate, tin benzoate, tin octoate, tin butyrate, dibutyltin dilaurate, dibutyltin diacetate, iron stearate and lead octoate; titanates such as tetraisopropyl titanate and tetrabutyl titanate; oxides such as dibutyltin oxide; and bases such as isophorone diamine, methylene dianiline, imidazole, gamma-aminopropyl triethoxy silane, aminoalcohols such as 2-amino-2-methyl-1-propanol and other basic nitrogen-containing compounds.

Compositions of the invention can contain organic solvents, examples of which include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as buty-acetate; hydrocarbons such as xylene and toluene; N-methyl-2-pyrrolidone; dimethyl formamide; and mixtures thereof.

Coating compositions of the invention may be applied to substrates using any suitable technique such as brushing, spraying, dipping, roll coating, doctor blade coating, curtain coating, etc.

Compositions of the invention may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, stontium chromate, lead chromate, molybdate red, chromoxide green, cobalt blue, organic pigments of the azo series, metallic flake pigments such as aluminum flakes and nickel flakes, etc. Mixtures of pigments also may be employed.

The following examples illustrate the invention and are not to be construed as limiting it to their details. As used herein, "pbw" means "parts by weight". All parts and percentages in the examples and throughout the specification are by weight unless specifically indicated otherwise.

EXAMPLE 1

(a) The following illustrates the preparation of the fatty acid-modified acrylic resin used in the preparation of Coating Compositions A, B-1, B-2, C-1, C-2, D-1, D-2, E-1 and E-2 below.

The following Charges I through IV are employed in the preparation of the fatty acid-modified acrylic resin.

Charge I consists of 594 grams (g) xylene.

Charge II consists of 79.6 g 2,2'-azobis(2,4-dimethylvaleronitrile) (available as VAZO 67), 238.7 g xylene, and 16 g xylene (rinse).

Charge III consists of 439.3 g methylmethacrylate, 839.2 g (5.9 moles) glycidylmethacrylate, 166.3 g styrene and 16 g xylene (rinse).

Charge IV consists of 1051.5 g (3.53 moles) PAMOLYN 380 (an unsaturated fatty acid derived from tall oil) and 60 g xylene (rinse).

A reaction vessel equipped with addition funnels, reflux condenser, thermometer, heater, stirrer and means for maintaining a nitrogen blanket is charged at room temperature under a blanket of nitrogen with Charge I and heated to reflux temperature at which temperature the slow, controlled addition of Charge II to the reaction vessel is begun. Ten minutes thereafter, the slow, controlled addition of Charge III is begun. The additions of Charges II and III to the reaction vessel take 2½ hours and 2 hours respectively while the contents of the vessel are refluxed. After the addition of Charge II is completed, reflux is continued for 1 hour after which Charge IV is added rapidly to the contents of the reaction vessel. Next, the contents of the vessel are heated to and held at from 160 to 165 degrees C. while a total of 648 g of distillate is removed and the acid value falls to 0.18. Thereafter heating is discontinued and the contents of the vessel are allowed to cool to ambient temperature. Next, the 648 g of distillate is returned to the contents of the vessel.

The resulting product is a fatty acid-modified acrylic resin. The product has a peak molecular weight of 11112, a number average molecular weight of 6899, and a weight average molecular weight of 17377 determined by gel permeation chromatography (GPC) using a polystyrene standard; and epoxy equivalent weight of 1707; a Gardner-Holdt viscosity of Z6-; and a total solids content of 72.0 percent by weight determined at 110 degrees C. for 1 hour.

(b) The following illustrates the preparation of a mill base used in Coating Compositions A, B-1, B-2, C-1, C-2, D-1, D-2, E-1 and E-2 below. The mill base is prepared from the ingredients set forth in the following Table I.

TABLE I

| Ingredient | Parts by Weight (grams) |
|---|---|
| (Mill Base) | |
| Fatty Acid-Modified Acrylic[1] | 540 |
| Organoclay[2] | 12 |
| Propylene carbonate | 4 |
| Dispersant[3] | 8 |
| Lecithin | 6 |
| Calcium drier[4] | 6 |
| Wax[5] | 48 |
| Methyl amyl ketone | 194 |
| Titanium dioxide pigment | 70 |
| Yellow iron oxide pigment | 60 |
| Silica alumina glass[6] | 490 |
| Barium sulfate pigment | 490 |

[1] The fatty acid-modified acrylic resin of part (a) above.
[2] An organic derivative of a smectite-type clay available as BENTONE 34 from NL Industries, Inc..
[3] A dispersant available as NUOSPERSE 657 from Tenneco Chemicals.
[4] Available as 6 percent calcium NuXtra$^R$ from Tenneco Chemicals.
[5] Available as Super Micron MEKON from Petrolite Corporation.
[6] Available as ZEEOSPHERES 400 from Zeelan Industries, Inc..

The above mill base is first dispersed utilizing a Cowles blade and thereafter dispersed in a laboratory pot sand mill to a value of 6 NS on a Hegman grind gauge.

(c) A Base Composition is prepared from the ingredients set forth in the following Table II.

TABLE II

| Ingredient | Parts by Weight (grams) |
|---|---|
| (Base Composition) | |
| Fatty Acid-Modified Acrylic[1] | 204 |
| Methyl amyl ketone | 171 |
| Silicone fluid solution[2] | 5 |
| Solution of 1,10 phenanthroline[3] | 4 |
| Titanium, bis(2,4-pentanedionate-0,0')-bis(2-propanolato)-[4] | 4 |
| Manganese drier[5] | 12 |
| Mill base[6] | 1928 |
| Total | 2328 |

[1] The resulting product of part (a) above.
[2] A 0.5 percent by weight solution of DOW CORNING 200 silicone fluid (100 centistokes) in xylene.
[3] A 38 percent by weight solution of 1,10 phenanthroline in hexylene glycol available as ACTIV-8 from R.T. Vanderbilt Co., Inc..
[4] Available as TYZOR AA from E.I. duPont de Nemours and Company.
[5] Available as 9 percent manganese NuXtra$^R$ drier from Tenneco Chemicals.
[6] As described in part (b) above.

The Base Composition is prepared by premixing the first six ingredients of Table II above and thereafter adding them under agitation to the sixth ingredient (mill base).

(d) A coating composition is prepared by reducing 955 g of the Base Composition of part (c) above with 30 g toluene. The resulting coating composition (hereinafter identified as Coating Composition A) has a viscosity of 22 seconds using an ultra calibrated No. 3 Zahn Cup and a content of volatile organic compounds (VOC) of 3.32 pounds/gallon determined at 110 degrees C. for 1 hour.

EXAMPLE 2

This example illustrates the preparation of coating compositions of the invention.

(a) An amino-functional silicon-containing resin having hydrolyzable groups is prepared as follows.

A reaction vessel equipped with addition funnel, thermometer, heater, stirrer and means for maintaining a nitrogen blanket is charged at room temperature under a blanket of nitrogen with 800 g (4.469 moles) of gamma-aminopropyltrimethoxysilane (available as A-

1110 from Union Carbide Corp.) and 500 g (3.68 moles) of methyltrimethoxysilane. The contents of the vessel are heated to 50 degrees C. over a period of 15 minutes at which temperature the slow, controlled addition of 982.5 g (2.23 moles) of the diglycidyl ether of hydrogenated bisphenol-A (available as DRH-151.1 from Shell Chemical Company) to the contents of the vessel is begun. The controlled addition of the DRH-151.1 takes 1 hour and 15 minutes while the contents of the vessel are maintained in a temperature range of from 50 to 53 degrees C. Thereafter, the contents of the vessel are maintained under agitation for 5 hours and 15 minutes and thereafter allowed to cool to ambient temperature.

Next, the reaction vessel is equipped for refluxing and the contents of the vessel are heated to reflux temperature over a period of 25 minutes and thereafter held at reflux for 2 hours after which heating is discontinued and the contents of the vessel allowed to cool to ambient temperature.

The resulting product is an amino-functional silicon-containing resin having hydrolyzable groups. The resin has a Gardner-Holdt bubble tube viscosity of 28.5 seconds.

(b) A coating composition of the invention (hereinafter Coating Composition B-1) is prepared from the ingredients as set forth in the following Table III.

TABLE III

| (Coating Composition B-1) | |
|---|---|
| Ingredient | Parts by Weight (grams) |
| Base Composition of Example 1(c) above | 200.0 |
| Amino-functional silicon-containing resin of Example 2(c) above | 6.9 |
| Methyltrimethoxysilane | 2.3 |
| Anhydrous ethanol | 10.0 |
| Total | 219.2 |

Coating Composition B-1 is prepared by premixing the latter three ingredients in Table III, and thereafter mixing the resultant composition with the first ingredient in Table III.

(c) A coating composition of the invention (hereinafter Coating Composition B-2) is prepared by blending one part by weight of Coating Composition B-1 with one part by weight of Coating Composition A as described in part (d) of Example 1.

EXAMPLE 3

This example illustrates the preparation of coating compositions of the invention.

(a) The following illustrates the preparation of an amino-functional silicon-containing resin having hydrolyzable groups by reaction of an amino-functional silicon-containing compound and an amine reactive acrylyl-containing compound.

A reaction vessel equipped with means for maintaining a nitrogen blanket is charged at ambient temperature with 265.2 parts of gamma-aminopropyltriethoxysilane (available as A-1100 from Union Carbide Company). Next, 135.6 parts by weight of hexanediol diacrylate (HDDA) is added slowly to the contents of the reaction vessel. The molar ratio of the A-1100 to the HDDA is 2:1. The addition of the HDDA to the reaction vessel causes the contents of the vessel to exotherm to about 45 degrees C. Thereafter, the contents of the vessel are allowed to cool to ambient temperature.

The resultant product is an amino-functional silicon-containing resin having hydrolyzable groups.

(b) A coating composition of the invention (hereinafter Coating Composition C-1) is prepared from the ingredients as set forth in the following Table IV.

TABLE IV

| (Coating Composition C-1) | |
|---|---|
| Ingredient | Parts by Weight (grams) |
| Base Composition of Example 1(c) above | 200.0 |
| Amino-functional silicon-containing resin of Example 3(a) above | 7.6 |
| Methyltrimethoxysilane | 2.3 |
| Anhydrous ethanol | 10.0 |
| Total | 219.9 |

Coating Composition C-1 is prepared by premixing the latter three ingredients in Table IV, and thereafter mixing the resultant composition with the first ingredient in Table IV.

(c) A coating composition of the invention (hereinafter Coating Composition C-2) is prepared by blending one part by weight of Coating Composition C-1 with one part by weight of Coating Composition A as described in part (d) of Example 1.

EXAMPLE 4

This example illustrates the preparation of coating compositions of the invention.

(a) An amino-functional silicon-containing resin having hydrolyzable groups is prepared as follows.

A reaction vessel equipped with addition funnel, thermometer, heater, stirrer and means for maintaining a nitrogen blanket is charged at room temperature under a blanket of nitrogen with 4400 g (19.91 moles) of gamma-aminopropyltriethoxysilane. The contents of the vessel are heated to 50 degrees C. at which temperature the slow, controlled addition of 4400 g (10 moles) of the diglycidyl ether of hydrogenated bisphenol-A (available as DRH-1510 from Shell Chemical Company) to the contents of the vessel is begun. The controlled addition of the DRH-1510 takes 1 hour and 58 minutes while the contents of the vessel are maintained in a temperature range of from 46 to 60 degrees C. Thereafter, the contents of the vessel are maintained under agitation for 3 hours and 22 minutes in a temperature range of from 48 to 70 degrees C. Immediately thereafter, 1200 g of methanol is added to the contents of the vessel and for the next 33 minutes the temperature is in the range of from 50 to 39 degrees C. Thereafter the contents of the vessel are allowed to cool to ambient temperature.

The resultant product is an amino-functional silicon-containing resin having hydrolyzable groups. The resin has a viscosity of 5.2 Stokes, a color value of 1, an amine equivalent weight of 536, an epoxy equivalent weight of infinity, and a total solids content of 69.1 percent by weight determined for 1 hour at 110 degrees C.

(b) A coating composition of the invention (hereinafter Coating Composition D-1) is prepared from the ingredients as set forth in the following Table V.

TABLE V

| (Coating Composition D-1) | |
|---|---|
| Ingredient | Parts by Weight (grams) |
| Base Composition of Example 1(c) above | 200.0 |
| Amino-functional silicon-containing resin | 7.8 |

TABLE V-continued (Coating Composition D-1)

| Ingredient | Parts by Weight (grams) |
|---|---|
| of Example 4(a) above | |
| Methyltrimethoxysilane | 2.3 |
| Anhydrous ethanol | 10.0 |
| Total | 220.1 |

Coating Composition D-1 is prepared by premixing the latter three ingredients in Table V, and thereafter mixing the resultant composition with the first ingredient in Table V.

(c) A coating composition of the invention (hereinafter Coating Composition D-2) is prepared by blending one part by weight of Coating Composition D-1 with one part by weight of Coating Composition A as described in part (d) of Example 1.

EXAMPLE 5

This example illustrates the preparation of coating compositions of the invention.

(a) An amino-functional silicon-containing resin having hydrolyzable groups is prepared as follows. This resin is prepared from an ungelled partially hydrolyzed organosilane.

To a flask equipped with addition funnel, reflux condenser, thermometer, heater, stirrer and nitrogen inlet is charged at room temperature (about 24 degrees C.) under a blanket of nitrogen, 4692.4 g of methyltrimethoxysilane (obtained as A-163 from Union Carbide Corp.) and 47.4 g of gamma-aminopropyltriethoxysilane (obtained as A-1100 from Union Carbide Corp.). Next, the contents of the flask are slowly heated to 50 degrees Celsius C. at which temperature the slow addition of deionized water to the contents of the flask is begun. While the contents of the flask are stirred, a total of 342 g of deionized water is added to the contents of the flask over a period of 1 hour and 15 minutes while the temperature of the contents of the flask is maintained in the range of from 50 to 52 degrees C. Thereafter, the contents of the flask are held for 48 minutes at from 50 to 52 degrees C. The flask is equipped for refluxing and the contents of the flask are heated over 15 minutes to reflux temperature and thereafter allowed to reflux for about 3 hours after which heating is discontinued and the contents of the flask allowed to cool to ambient temperature. The composition in the flask at this point is an ungelled partially hydrolyzed organosilane.

Next, 1268.8 g of gamma-aminopropyltriethoxysilane is added at ambient temperature to the contents of the flask, after which the contents of the flask are heated to 50 degrees C. at which temperature the slow, controlled addition of 1268.8 g of the diglycidyl ether of hydrogenated bisphenol-A (obtained as DRH-1510 from Shell Chemical Company) to the flask is begun. The addition of the DRH-1510 takes 1 hour and 36 minutes during which period the temperature of the contents of the flask is between 50 to 52 degrees C. Thereafter, the contents of the flask are maintained at 50 to 52 degrees C. for about 1 hour. Next, the contents of the flask (equipped for refluxing) are heated over about 20 minutes to reflux temperature (about 68 to 72 degrees C.) and thereafter held at reflux for 2 hours and 43 minutes after which heating is discontinued and the contents of the flask allowed to cool to 62 degrees C. at which temperature 380 g of gamma-glycidoxypropyltrimethoxysilane is added to the flask. Thereafter, the contents of the flask are maintained for about 3 hours at about 62 degrees C. after which heating is discontinued and the contents of the flask allowed to cool to ambient temperature.

The resultant product is an amino-functional silicon-containing resin having hydrolyzable groups. The resin has a Gardner-Holdt viscosity of less than A, a color value of 1, an epoxy equivalent weight of infinity, and a total solids content of 43.9 percent by weight determined for 1 hour at 110 degrees C.

(b) A coating composition of the invention (hereinafter Coating Composition E-1) is prepared from the ingredients as set forth in the following Table VI.

TABLE VI (Coating Composition E-1)

| Ingredient | Parts by Weight (grams) |
|---|---|
| Base Composition of Example 1(c) above | 200.0 |
| Amino-functional silicon-containing resin of Example 5(a) above | 8.1 |
| Methyltrimethoxysilane | 2.3 |
| Anhydrous ethanol | 10.0 |
| Total | 220.4 |

Coating Composition E-1 is prepared by premixing the latter three ingredients in Table VI, and thereafter mixing the resultant composition with the first ingredient in Table VI.

(c) A coating composition of the invention (hereinafter Coating Composition E-2) is prepared by blending one part by weight of Coating Composition E-1 with one part by weight of Coating Composition A as described in part (d) of Example 1.

EXAMPLE 6

This example illustrates the preparation of cured coatings from each of Compositions A (comparison), B-1, B-2, C-1, C-2, D-1, D-2, E-1 and E-2 described above. All of these compositions has a pot life of at least five days, i.e., none of the compositions gelled after 5 days at ambient conditions.

Shortly after each of Coating Compositions A, B-1, B-2, C-1, C-2, D-1, D-2, E-1 and E-2 is prepared, the coating composition is spray applied to an iron phosphate-treated, steel panel and the resultant coating is cured for 15 minutes at 150 degrees F. (65.6 degrees C.) to a smooth continuous film. Sixteen days after curing, each of the cured films is subjected to the following tests.

Six days after curing, each of the cured films is subjected to 15 double rubs (i.e., back and forth finger rubs) with a cloth dipped in 1,1,1-trichlorethane (TCE) after which the decrease in gloss of the film is rated. A rating of "poor" means that a severe decrease in gloss is observed. A rating of "very good" means that only a slight decrease in gloss is observed. The results are set forth in the following Table VII.

Six days after curing several drops of 1,1,1-trichloroethane (TCE) are applied to each of the cured films to form a small pool (spot) of TCE on the film. After allowing the pool to remain for 5 minutes on the film, the film is dried and judged for hardness by probing the film with a fingernail at the place where the TCE lay on the film. The results are set forth in the following Table VII.

TABLE VII

| Coating | DFT (mils) | TCE Double Rubs | TCE Spot Test |
|---|---|---|---|
| A | 2.5 | Poor | Very Soft |
| B-1 | 2.3–2.5 | Very Good | Slightly Soft |
| B-2 | 2.1–2.6 | Good | Slightly Soft |
| C-1 | 2.3–2.7 | Very Good | Slightly Soft |
| C-2 | 2.2–2.3 | Good | Slightly Soft |
| D-1 | 2.7–2.9 | Good | Slightly Soft |
| D-2 | 2.3–2.8 | Fair | Slightly Soft |
| E-1 | 2.4–2.7 | Fair to Good | Slightly Soft |
| E-2 | 2.2–2.7 | Good | Slightly Soft |

Each of the cured films is allowed to age further for a total of 8 weeks aging at ambient conditions after curing. At the end of this eight week period the pencil hardness (according to ASTM D3363) and the direct impact resistance (according to ASTM D2794 using 80 inch-pounds) of each of the cured films is measured. "Pass" for the direct impact test means that the film after impact is not removed when Scotch Tape is applied to the area of impact and quickly ripped from the film. The results of these tests are set forth in the following Table VIII.

TABLE VIII

| Coating | Pencil Hardness | Direct Impact (80 inch-pounds) |
|---|---|---|
| A | HB | Pass |
| B-1 | 2H | Pass |
| B-2 | H | Pass |
| C-1 | ** | ** |
| C-2 | H | Pass |
| D-1 | F | Pass |
| D-2 | H | Pass |
| E-1 | F | Pass |
| E-2 | H | Pass |

**Not measured.

Not only did the cured coatings (B-1 through E-2) prepared from the compositions of the invention have very good pencil hardness, but they did not become brittle on aging as measured by impact resistance.

What is claimed is:

1. A curable composition comprising:
   (1) a resin containing at least one air-oxidizable group and at least one epoxy group, and
   (2) a compound having in a molecule thereof at least one epoxy-reactive moiety and at least one silicon atom directly bonded to a group Y wherein Y represents a hydrolyzable group.

2. The curable composition of claim 1 wherein said resin is selected from the group consisting of a vinyl addition resin, a polyester resin, an amide-containing resin, a urethane resin, a polyepoxide resin, an aminoplast resin, a phenoplast resin, and a polybutadiene resin.

3. The curable composition of claim 1 wherein said resin is a vinyl addition resin.

4. The curable composition of claim 3 wherein said vinyl addition resin is an air-drying fatty acid-modified vinyl polymerized resin containing moieties derived from;
   (a) a copolymerizable monomer containing an epoxy group, and
   (b) an air-drying fatty acid which esterifies through the epoxy group.

5. The curable composition of claim 4 wherein said vinyl polymerized resin additionally contains a moiety derived from (c) another copolymerizable monomer which is different from (a).

6. The curable composition of claim 1 wherein Y is selected from the group consisting of —OR$^1$,

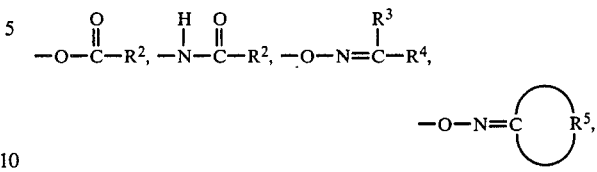

and the monohydroxy and/or cyclic $C_2$–$C_3$ residue of a 1,2- or 1,3-glycol,
wherein
   $R^1$ represents $C_1$–$C_3$ alkyl,
   $R^2$ independently represents H or $C_1$–$C_4$ alkyl,
   $R^3$ and $R^4$ independently represent H, $C_1$–$C_4$ alkyl, $C_6$–$C_8$ aryl and
   $R^5$ represents $C_4$–$C_7$ alkylene.

7. The curable composition of claim 1 wherein said compound is an amine.

8. The curable composition of claim 7 wherein said amine comprises a reaction product of an amino-functional silicon-containing compound and a compound containing at least one epoxy group.

9. The curable composition of claim 7 wherein said amine comprises a reaction product of
   (a) an amino-functional silicon-containing compound,
   (b) a compound containing at least one epoxy group, and
   (c) an organosilicon-containing material comprising a compound, corresponding to the formula R—Si(OR$^6$)$_3$
   wherein
      R independently represents OR$^6$, hydrogen, a $C_1$–$C_{10}$ group joined to Si through an Si—C linkage, or a OR$^7$ group in which R$^7$ represents alkyl having at least 4 carbon atoms, aryl, alkylaryl, arylalkyl, aryloxyalkyl, or alkyloxyalkyl, and
      R$^6$ independently represents a $C_1$–$C_3$ alkyl group.

10. The curable composition of claim 7 wherein said amine comprises a reaction product of an amino-functional silicon-containing compound and an amine reactive acrylyl-containing compound.

11. The curable composition of claim 7 wherein said amine comprises
   (a) a reaction product of
      (a) an amino-functional silicon-containing compound, and
      (b) a compound containing at least one epoxy group, and
   (2) an organosilicon-containing material comprising a partial hydrolysis product of a compound corresponding to the formula R—Si(OR$^6$)$_3$
   wherein
      R independently represents OR$^6$, hydrogen, a $C_1$–$C_{10}$ group joined to Si—C linkage, or an OR$^7$ group in which R$^7$ represents alkyl having at least 4 carbon atoms, aryl, alkylaryl, arylalkyl, aryloxyalkyl, or alkyloxyalkyl, and
      R$^6$ independently represents a $C_1$–$C_3$ alkyl group.

12. The curable composition of claim 3 wherein said compound is an amine.

13. The curable composition of claim 12 wherein Y is selected from the group consisting of —OR$^1$,

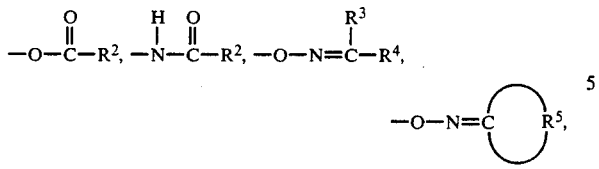

and the monohydroxy and/or cyclic $C_2$-$C_3$ residue of a 1,2- or 1,3-glycol,
wherein
$R^1$ represents $C_1$-$C_3$ alkyl,
$R^2$ independently represents H or $C_1$-$C_4$ alkyl,
$R^3$ and $R^4$ independently represent H, $C_1$-$C_4$ alkyl, $C_6$-$C_8$ aryl and
$R^5$ represents $C_4$-$C_7$ alkylene.

14. The curable composition of claim 12 wherein said amine comprises a reaction product of an amino-functional silicon-containing compound and a compound containing at least one epoxy group.

15. The curable composition of claim 12 wherein said amine comprises a reaction product of
    (a) an amino-functional silicon-containing compound,
    (b) a compound containing at least one epoxy group, and
    (c) an organosilicon-containing material comprising a compound corresponding to the formula R—Si(OR$^6$)$_3$
    wherein
    R independently represents OR$^6$, hydrogen, a $C_1$-$C_{10}$ group joined to Si through an Si—C linkage, or a OR$^7$ group in which R$^7$ represents alkyl having at least 4 carbon atoms, aryl, alkylaryl, arylalkyl, aryloxyalkyl, or alkyloxyalkyl, and
    R$^6$ independently represents a $C_1$-$C_3$ alkyl group.

16. The curable composition of claim 12 wherein said amine comprises a reaction product of an amino-functional silicon-containing compound and an amine reactive acrylyl-containing compound.

17. The curable composition of claim 12 wherein said amine comprises
    (1) a reaction product of
        (a) an amino-functional silicon-containing compound, and
        (b) a compound containing at least one epoxy group, and
    (2) an organosilicon-containing material comprising a partial hydrolysis product of a compound corresponding to the formula R—Si(OR$^6$)$_3$
    wherein
    R independently represents OR$^6$, hydrogen, a $C_1$-$C_{10}$ group joined to Si through an Si—C linkage, or a OR$^7$ group in which R$^7$ represents alkyl having at least 4 carbon atoms, aryl, alkylaryl, arylalkyl, aryloxyalkyl, or alkyloxyalkyl, and
    R$^6$ independently represents a $C_1$-$C_3$ alkyl group.

18. A two-pack, curable composition comprising:
    (1) a first pack comprising a resin containing at least one air-oxidizable group and at least one epoxy group, and
    (2) a second pack comprising a compound having in a molecule thereof at least one epoxy-reactive moiety and at least one silicon atom directly bonded to a group Y wherein Y represents a hydrolyzable group.

19. The two-pack, curable composition of claim 18 wherein said resin is selected from the group consisting of a vinyl addition resin, a polyester resin, an amide-containing resin, a urethane resin, a polyepoxide resin, an aminoplast resin, a phenoplast resin, and a polybutadiene resin.

20. The two-pack, curable composition of claim 18 wherein said resin is a vinyl addition resin.

21. The two-pack, curable composition of claim 18 wherein said compound is an amine.

22. The two-pack, curable composition of claim 21 wherein said amine comprises a reaction product of an amino-functional silicon-containing compound and a compound containing at least one epoxy group.

23. The two-pack, curable composition of claim 21 wherein said amine comprises a reaction product of
    (a) an amino-functional silicon-containing compound,
    (b) a compound containing at least one epoxy group, and
    (c) an organosilicon-containing material comprising a compound corresponding to the formula R—Si(OR$^6$)$_3$
    wherein
    R independently represents OR$^6$, hydrogen, a $C_1$-$C_{10}$ group joined to Si through an Si—C linkage, or a OR$^7$ group in which R$^7$ represents alkyl having at least 4 carbon atoms, aryl, alkylaryl, arylalkyl, aryloxyalkyl, or alkyloxyalkyl, and
    R$^6$ independently represents a $C_1$-$C_3$ alkyl group.

24. The two-pack, curable composition of claim 21 wherein said amine comprises a reaction product of an amino-functional silicon-containing compound and an amine reactive acrylyl-containing compound.

25. The two-pack, curable composition of claim 21 wherein said amine comprises
    (1) a reaction product of
        (a) an amino-functional silicon-containing compound, and
        (b) a compound containing at least one epoxy group, and
    (2) an organosilicon-containing material comprising a partial hydrolysis product of a compound corresponding to the formula R—Si(OR$^6$)$_3$
    wherein
    R independently represents OR$^6$, hydrogen, a $C_1$-$C_{10}$ group joined to Si through an Si—C linkage, or a OR$^7$ group in which R$^7$ represents alkyl having at least 4 carbon atoms, aryl, alkylaryl, arylalkyl, aryloxyalkyl, or alkyloxyalkyl, and
    R$^6$ independently represents a $C_1$-$C_3$ alkyl group.

* * * * *